(12) United States Patent
Kale et al.

(10) Patent No.: US 11,829,375 B2
(45) Date of Patent: Nov. 28, 2023

(54) ENHANCED SEARCH SYSTEM FOR AUTOMATIC DETECTION OF DOMINANT OBJECT OF SEARCH QUERY

(71) Applicant: eBay Inc., San Jose, CA (US)

(72) Inventors: Ajinkya Gorakhnath Kale, San Jose, CA (US); Thrivikrama Taula, San Jose, CA (US); Amit Srivastava, San Jose, CA (US)

(73) Assignee: eBay Inc., San Jose, CA (US)

( * ) Notice: Subject to any disclaimer, the term of this patent is extended or adjusted under 35 U.S.C. 154(b) by 111 days.

(21) Appl. No.: 17/318,653

(22) Filed: May 12, 2021

(65) Prior Publication Data

US 2021/0263943 A1 Aug. 26, 2021

Related U.S. Application Data

(63) Continuation of application No. 16/290,567, filed on Mar. 1, 2019, now Pat. No. 11,036,746.
(Continued)

(51) Int. Cl.
*G06F 16/30* (2019.01)
*G06F 16/2457* (2019.01)
(Continued)

(52) U.S. Cl.
CPC ...... *G06F 16/24578* (2019.01); *G06F 16/285* (2019.01); *G06F 16/9535* (2019.01)

(58) Field of Classification Search
CPC ............. G06F 16/24578; G06F 16/285; G06F 16/9535
See application file for complete search history.

(56) References Cited

U.S. PATENT DOCUMENTS 8,954,440 B1 2/2015 Gattani et al.
9,177,057 B2 11/2015 Vadlamani et al.
(Continued)

OTHER PUBLICATIONS

Non-Final Office Action Received for U.S. Appl. No. 16/290,567, dated Sep. 23, 2020, 16 pages.
(Continued)

*Primary Examiner* — Khanh B Pham
(74) *Attorney, Agent, or Firm* — SHOOK, HARDY & BACON L.L.P.

(57) ABSTRACT

Various methods and systems for determining a dominant object of a query and employing the dominant object to provide enhanced search services are discussed. A query is segmented into a set of n_grams. Entity extraction and resolution (EER) methods are employed to determine implicit and explicit aspects for each n_gram. N_grams that include explicit aspects are pruned from the set of n_grams and a pruned set of candidate n_grams is generated from the non-pruned n_grams. Knowledge graphs are employed to generate a ranked list of associated categories for each candidate n_gram. A ranked list of categories associated with the un-segmented query is generated based on knowledge graphs. The candidate n_gram with the highest ranked associated category that is also a highly ranked category associated with the un-segmented query is selected as the dominant object of the query. Enhanced search results are provided based on the determined dominant object.

20 Claims, 6 Drawing Sheets

Related U.S. Application Data (60) Provisional application No. 62/637,219, filed on Mar. 1, 2018.

(51) Int. Cl.
  *G06F 16/9535* (2019.01)
  *G06F 16/28* (2019.01)

(56) References Cited

U.S. PATENT DOCUMENTS

| | | | |
|---|---|---|---|
| 9,690,847 | B2 | 6/2017 | Kaneda et al. |
| 11,036,746 | B2 | 6/2021 | Kale et al. |
| 2005/0102251 | A1* | 5/2005 | Gillespie ............. G06F 16/3338 |
| 2009/0248669 | A1 | 10/2009 | Shetti et al. |
| 2011/0035403 | A1 | 2/2011 | Ismalon |
| 2012/0197905 | A1 | 8/2012 | Kumar et al. |
| 2012/0323948 | A1* | 12/2012 | Li ....................... G06F 16/3323 |
| | | | 707/765 |
| 2013/0086509 | A1 | 4/2013 | Satyanarayana et al. |
| 2013/0103389 | A1 | 4/2013 | Gattani et al. |
| 2014/0344261 | A1* | 11/2014 | Navta .................. G06F 16/951 |
| | | | 707/723 |
| 2015/0052143 | A1 | 2/2015 | Liu et al. |
| 2016/0026696 | A1 | 1/2016 | Madhavan et al. |
| 2016/0179801 | A1 | 6/2016 | Venkataraman et al. |
| 2018/0150552 | A1 | 5/2018 | Wang et al. |
| 2018/0329999 | A1 | 11/2018 | Kale et al. |
| 2019/0272274 | A1 | 9/2019 | Kale et al. |
| 2020/0210506 | A1* | 7/2020 | Schoenberg ........ G06F 16/2379 |
| 2021/0133224 | A1* | 5/2021 | Tiwari ................. G06F 16/951 |

OTHER PUBLICATIONS

Notice of Allowance received for U.S. Appl. No. 16/290,567, dated Feb. 9, 2021, 9 Pages.

Kale et al., "Towards Semantic Query Segmentation", Retrieved from the Internet URL: <https://arxiv.org/pdf/1707.07835.pdf>, Jul. 25, 2017, 4 pages.

Radev et al., "Ranking suspected answers to natural language questions using predictive annotation", 2000, pp. 150-157.

Wu et al., "A New Approach to Query Segmentation for Relevance Ranking in Web Search", 2015, 28 pages.

* cited by examiner

ENHANCED SEARCH SYSTEM FOR AUTOMATIC DETECTION OF DOMINANT OBJECT OF SEARCH QUERY

CROSS-REFERENCE TO RELATED APPLICATIONS

This application is a continuation of U.S. application Ser. No. 16/290,567 filed Mar. 1, 2019, which itself claims the benefit of U.S. Provisional Application No. 62/637,219 filed Mar. 1, 2018. The entire contents of each are incorporated by reference herein.

BACKGROUND

Users increasingly expect modern search systems to intelligently process search queries that include complex natural language sentences, sentence fragments, declarative statements, questions, and phrases, i.e., strings of natural language words. For example, when browsing an online product listing platform, a user may provide the platform's search engine a complex search query that describes an item of interest via a complex natural language phrase (e.g., "red cheap coffee grinder"). The user expects the search engine to return multiple available coffee grinders that are colored red and offered for sale at relatively inexpensive prices. However, depending upon the search engine's natural language processing (NLP) abilities, the search engine may provide search results that are inconsistent with the user's search needs.

SUMMARY

Embodiments of the present invention relate to methods, systems, and computer storage media for the automatic detection and determination of a dominant object of natural language sentences, sentence fragments, declarative statements, questions, and phrases. More specifically, the embodiments provide various search systems with the capability to automatically detect the dominant object of a complex natural language-based search query ("query"). Upon detection of the dominant object of the query, a search system may provide enhanced search services, such as intelligently modifying search constraints, audibly summarizing search conditions for a user of a speech-based system, or providing related and alternative search results based on the automatically detected dominant object of the query. For example, when search results that specifically match the search query are unavailable or sparse, an enhanced search system may pivot a search operation based on the dominant object. The pivoted search operation may return more robust and alternative search results that are consistent with the user's search intent. In some of the embodiments, the enhanced search system is deployed within a product listing ecosystem such as to an online auction or e-commerce platform.

In the various embodiments, in operation, a complex natural language-based sentence, sentence fragment, declarative statement, question, or phrase is received as a query. To determine the dominant object of the query, the query is segmented into a plurality of n-grams. Each n-gram may include an ordered sequence of one or more tokens (i.e., natural language words) included in the query. Thus, the query is segmented into a set of n-grams, where the union of the set of n-grams includes the query. Natural language processing (NLP) methods are employed to extract and resolve various implicit and explicit aspects (or attributes) of each of the n-grams. For example, an n-gram with an explicit aspect (e.g., "red") may complement or modify an n-gram that includes implicit aspects (e.g., "coffee grinder"). The set of n-grams is pruned to exclude n-grams with explicit aspects. That is, at least a portion of n-grams that explicitly modify other n_grams may be pruned from the set of n_grams. The n-grams remaining in the pruned set of n-grams may be referred to as "candidate n-grams."

Knowledge graphs of ranked categories of candidate n-grams are compared to knowledge graphs of ranked categories of the query (i.e., un-segmented query) to identify a candidate n-gram with the highest ranking category. A knowledge graph, for example, may include definitions of categories, connections or interrelationships of the entities (i.e., n-grams) in a domain. A knowledge graph may be a graph, which includes nodes representing categories, objects, persons, places, things, concepts, ideas, and knowledge, for example. The connections between the nodes may represent relationships between the nodes. Thus, a knowledge graph may be traversed to determine and rank categories associated with n-grams having one or more tokens. As such, one or more knowledge graphs are employed to generate a ranked list of associated categories for each candidate n-gram. That is, for a particular candidate n-gram, previously generated knowledge graphs are employed to determine categories that the particular candidate n-gram is associated with. A ranking of the categories associated with the particular candidate n-gram is performed via the connections within the knowledge graphs. One or more knowledge graphs are similarly employed to determine a ranked list of categories associated with the un-segmented query. The candidate n-gram with the highest ranking category that is also highly ranked within the categories of the un-segmented query is selected as the dominant object of query. An enhanced search system may provide enhanced search services, based on the determined dominant object of the query, as discussed herein.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Conventional search systems return search results based on natural language-based sentences, sentence fragments, declarative statements, questions, and phrases, broadly referred to herein as a "search query," or simply a "query." For example, a query typical for an online product listing or online marketplace ecosystem, may include the phrase "cheap red coffee grinder." Conventional search systems may not be enabled to automatically identify a dominant object of the query. In the above first example query, the dominant object includes the object that the user is interested in buying, i.e., "coffee grinder." The dominant object of the query is generally the primary object that the query is directed towards and is without specific aspects, attributes, and modifiers. In the example query, "red" is an explicit aspect (or attribute) that modifies the dominant object, while "cheap" is an abstract aspect or attribute that modifies the dominant object, which includes only implicit aspects. In contrast to conventional search systems, the various embodiments described herein automatically determine or detect the dominant object of a query. As discussed throughout, the automatic detection of the dominant object of the query enables various enhanced search services.

By way of context, a "query" may refer to any natural language-based sentence(s), sentence fragments, declarative statement, question, or phrases. As used herein, a "token" may refer to any natural language word, abbreviation, hyphenated word, set of words, or other such natural language objects. Thus, a query may be an ordered sequence of one or more tokens. In some embodiments, a query is an ordered string of tokens. An n-gram may be a segment of the query that includes n consecutive tokens of the query, where n is a positive integer and represents the number of tokens included in the n-gram.

The first example query "red cheap coffee grinder" includes four tokens: "red," "cheap," "coffee," and "grinder." A second example query "long sleeve summer dress," also includes four tokens, "long," "sleeve," "summer," and "dress." A third example query "ACME blue rock climbing shoes" includes five tokens "ACME," "blue," "rock," "climbing," and "shoes." With embodiments described herein, provided each of the three example queries, the embodiments automatically determine the corresponding dominant objects as: "coffee grinder," "summer dress," and "rock climbing shoes," respectively. The tokens not included in the dominant objects ("red," "cheap," "long," "sleeve," ACME," and "blue") serve to modify and augment the corresponding dominant object.

In the various embodiments, in operation, a query, such as of the above three example queries, is received. The query is segmented into one or more contextually meaningful n-grams. Distributed query embeddings are employed to segment the query into meaningful n-grams. Various embodiments of segmenting a query into a plurality of n-grams are discussed within U.S. application Ser. No. 15/681,663 (the '663 application), entitled METHODS AND SYSTEMS FOR QUERY SEGMENTATION, filed on Aug. 21, 2017, the contents of which are herein incorporated in their entirety. However, briefly here, in some embodiments, each token in a query may be embedded within a low-dimensional feature space, where the boundaries between n-grams are determined based on the vectors representing consecutive tokens in the query. A segmenter model may be trained via supervised learning techniques to embed tokens within a latent or hidden feature space and determine the boundaries between n-grams within a query. A word embedder may be employed to embed each token of a query within the low-dimensional features space. Generally, a word embedder determines and generates a multi-dimensional vector that represents (or embeds) a token within a multi-dimensional vector space based on features, such as hidden or latent features, of the token. The components of the encoding vector encode a particular token to indicate the features of the particular token. Various word embedders, such as word2vec, Glove, or fastText may be employed to embed the tokens within the vector space.

A trained segmenter model may be employed to segment the query via determination of boundaries between consecutive n-grams based on the vector representation of the embedded tokens. A segmenter model may generate an n-gram boundary between two consecutive tokens in the query based on a distance between the vector encodings of the consecutive tokens. For example, when the distance between the vectors of two consecutive words is less than a threshold, the tokens are sufficiently "close enough" that the tokens are kept together in an n-gram. In contrast, when the distance between the two vectors is larger than a threshold, then the segmenter model generates an n_gram boundary between the two consecutive tokens and the two consecutive tokens are not included in the same n_gram. The distance thresholds may be learned via machine learning.

In the first example query, a first vector represents the first token "red," a second vector represents the second token "cheap," a third vector represents the third token "coffee," and a fourth vector represents the fourth token "grinder." Based on at least a distance metric between the first and second vectors, the trained segmenter model generates an n-gram boundary between the first and second tokens, if the distance between the vectors encoding the first and second tokens is greater than a threshold. Based on the distance between the second and third vectors, the trained segmenter model generates another n-gram boundary between the second and third tokens. Based on the distance between the third and fourth vectors, the trained segmenter model does not generate an n-gram boundary between the third and fourth tokens because the distance is less than a predetermined threshold, i.e., the embedded tokens "coffee" and "grinder" are sufficiently close within the feature vector space.

Thus, the first example query is segmented into a set of three meaningful n-grams: {"red", "cheap", "coffee grinder"}. Similarly, the second example query is segmented into a set of two meaningful n-grams: {"long sleeve", "summer dress"}. The third example query may be segmented into a set of three meaningful n-grams {"ACME", "blue", "rock climbing shoes"}. Note that the segmenter model may be trained to segment a query into n-grams that are meaningful for the context of use. For example, a segmenter model may be trained, via labeled training data, to segment queries based on aspects (or attributes) that are meaningful in the context of product listings and online marketplaces.

Upon the segmentation of the query into a plurality of meaningful n-grams, an Entity Extraction and Resolution (EER) framework or engine is employed to extract and resolve implicit, abstract, and explicit aspects of each of the n-grams. For example, one or more aspects of each of the n-grams may be identified. The aspects may be identified as explicit, implicit, abstract, or the like. For example, some n-grams may be identified as including explicit aspects, such as color (e.g., red, blue, and the like). While other n-grams may be identified as including abstract aspects such as "cheap." Other n-grams are identified as including implicit attributes such as "coffee grinder", "summer dress," and "rock climbing shoes." N-grams that include explicit aspects such as a color are pruned from the set of n-grams. Thus, the set of n-grams {"red", "cheap", "coffee grinder"} is pruned to the pruned set of n-grams {"cheap", "coffee grinder"}. For each n-gram remaining in the pruned set of n-grams, a ranked list of associated categories is determined or generated.

Knowledge graphs of ranked categories of candidate n-grams are compared to knowledge graphs of ranked categories of the query (i.e., un-segmented query) to identify a candidate n-gram with the highest ranking category. In particular, one or more previously generated knowledge graphs are employed to determine the ranked list of categories associated with a particular n-gram (i.e., candidate n-gram) of the pruned set of n-grams. Because the un-segmented query is an n-gram, knowledge graphs may be similarly employed to generate a ranked list of categories associated with the un-segmented query. Note that the n for the un-segmented query is greater than then for any of the n-grams in the pruned set of n-grams. The dominant object of the query is determined based on a comparison of the ranked list of associated categories for the un-segmented query with each of the ranked lists of associated categories for the n-grams in the pruned set of n-grams. The n-gram with the highest rank category that matches a high-ranking category associated with the un-segmented query is selected as the dominant object of the query. Thus, in the above example, the ranked list of categories associated with the n-gram "coffee grinder" are compared to the ranked list of categories associated with the n-gram "red cheap coffee grinder." The ranked list of categories associated with the n-gram "cheap" are also compared to the ranked list of categories associated with "red cheap coffee grinder."

For example, because one or more higher-ranked categories associated with "red cheap coffee grinder" more closely match one or more higher-ranked categories associated with "coffee grinder" than the higher-ranked categories associated with "cheap," the embodiments select the n-gram "coffee grinder" as the dominant object of the query "red cheap coffee grinder." A similar process results in the determination of "summer dress," as the dominant object of the query "long sleeve summer dress" and the determination of "rock climbing shoes" as the dominant object of the query "ACME blue rock climbing shoes."

Upon the determination of the dominant object of a search query, enhanced search services, may be provided to a user, based on the dominant object. Such enhanced search services include the intelligent modification of search attributions. For example, an enhanced search system may pivot the search based on the dominant object. Moreover, additional and alternative search results may be provided based on the dominant object "coffee grinder," such as coffee beans, coffee filters, and coffee. When search results specifically matching the query are unavailable or sparse, an enhanced search system may provide results that closely match the user's search needs, such as coffee grinders, that are in a color that is not red, or coffee grinders that are priced higher than "cheap" models.

In addition, enhanced search services may include providing the dominant object for display on an interface of a computing device. The dominant object may be highlighted in the search query for display on an interface of a computing device. Enhanced search services may also include audibly summarizing a search request. A user may employ a voice-activated and speech based virtual assistant ("VA") running on a computing device such a mobile device or a specialized stand-alone VA device. As an example, a user may provide, via audible speech, a query such as "I am looking for a dining table traditional wood" to a voice-activated VA device. The VA may employ the various embodiments to determine that the dominant object of the query is "dining table." The enhanced search services of the VA may echo back a summarized, or rephrased, version of the search query. The VA may provide an audible reply to user, based on the determined dominant object. Such a reply may include "let me find you a good deal on the dining table you are looking for," "I have found a good deal on the dining table you were searching for last week," or other similar replies. Such enhanced search services may enable agents (e.g., shopping bots), or other automated mechanisms, to provide significantly improved transactions within product listing platforms or online marketplaces, such as but not limited to online auction ecosystems.

Embodiments of the present invention can be described with reference to several inventive features (e.g., operations, systems, engines, and components) associated with a search system enabled to automatically determine or detect the dominant object of a query. Inventive features described below include: operations for automatically determining the dominant object of a provided query and providing enhanced search services based on the automatically determined dominant object. Functionality of the embodiments of the present invention can further be described, as done below, by way of an experimental implementation and anecdotal examples, to demonstrate that the operations for receiving a query, determining the dominant object of the query, and providing enhanced search services based on the dominant object. Such operations provide a solution to a specific problem in a search technology environment to improve computing operations in generating search results that are more consistent with a user's search needs and improve search systems overall.

Figure 1:
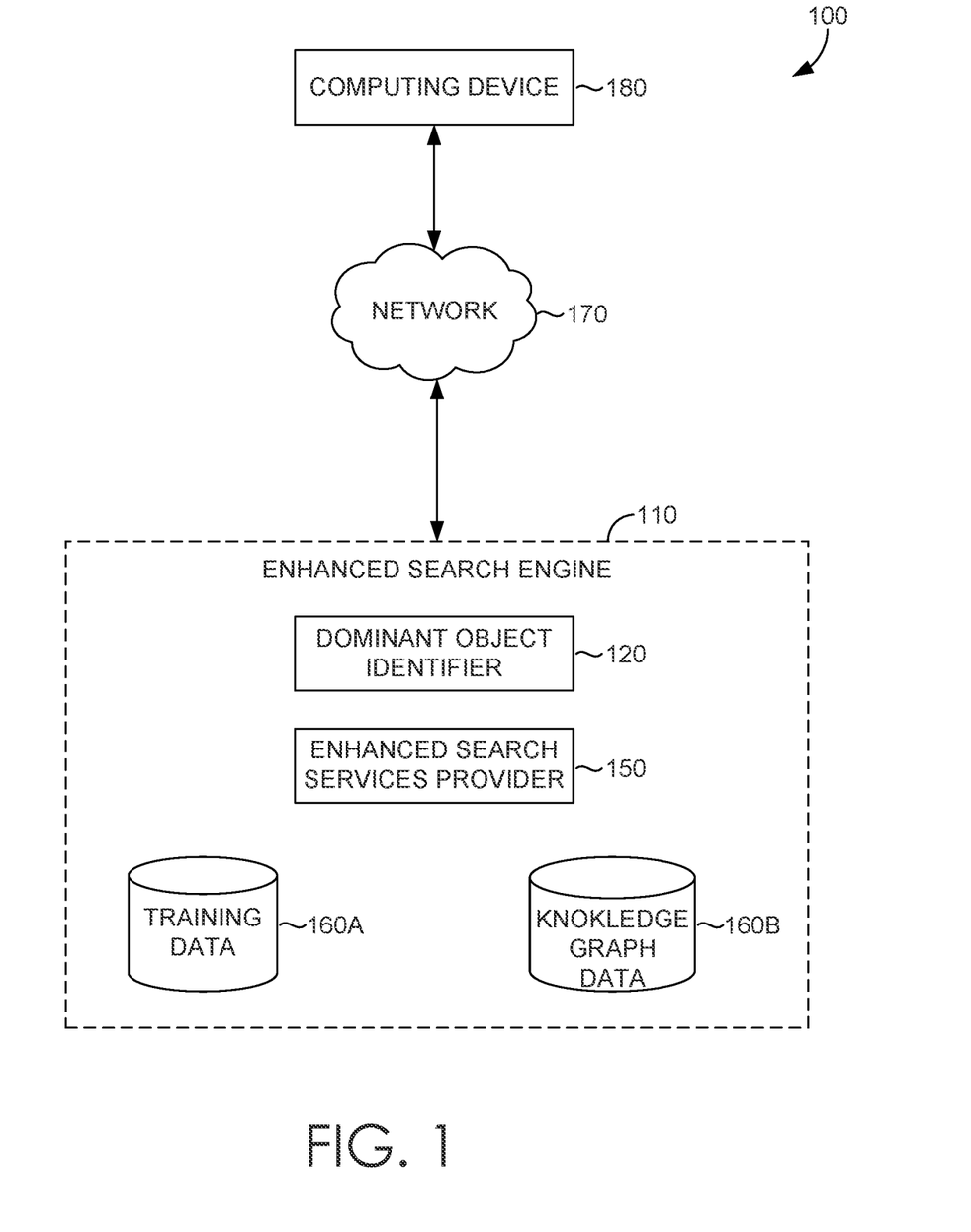
FIG. 1 is a block diagram of an exemplary enhanced search system with a dominant object identifier, in which embodiments described herein may be employed.

With reference to FIG. 1, FIG. 1 illustrates an exemplary enhanced search system 100 in which implementations of the present disclosure may be employed. In particular, FIG. 1 shows a high level architecture of enhanced search system 100 having components in accordance with implementations of the present disclosure. Among other components or engines not shown, search system 100 includes a computing device 180 communicating via a network 170 with an enhanced search engine 110. The enhanced search engine 110 includes dominant object identifier 120, enhanced search services provider 150, training data 160A, and knowledge graph data 160B. The components of the search system 100 may communicate with each other over one or more networks (e.g., public network or virtual private network "VPN") as shown with network 170. The network 170 may include, without limitation, one or more local area networks (LANs) and wide area networks (WANs). The computing device 180 can be a client computing device that corresponds to the computing device described herein with reference to FIG. 5.

The components of the search system 100 can operate together to provide functionality for automatically determining and identifying the dominant object of a query, and provide enhanced search services based on the identified dominant object, as described herein. The search system 100 supports processing queries from the computing device 180. In particular, the computing device 180 can receive a query (e.g., a query from a user of computing device 180) and communicate the query to the search engine 110. The computing device 180 can also operate with the enhanced search services, including receiving enhanced search results, for the query from the search engine 110 and display or cause display of the result items.

The enhanced search engine 110 is responsible for interfacing with computing device 180, in order to receive a query, determine the dominant object of the query, and provide enhanced search services to a user of computing device 180 based on the determined dominant object. The search engine components of enhanced search engine 110 include dominant object identifier 120, enhanced search services provider 150, training data database 160A, and knowledge graph database 160B.

At a high level, based on a query received via the computing device 180, search engine 110 operations are performed using the dominant object identifier to determine and identify the dominant object of a query and the enhanced search services provider 150 to enable and provide the enhanced search services based on the determined dominant object. Training data included in training data database 160A is employed to train various machine learning models employed by dominant object identifier 120 and enhanced search services provider 150. For instance, a segmenter model (e.g., segmenter model 232) employed by dominant object identifier to segment the query into one or more meaningful n-grams may be trained via supervised learning using labeled training data included in the training data database 160A. Various machine learning models that determine implicit and explicit aspects of the segmented n-grams may be trained via training data. Any labeled or un-labeled training data may be included in training data database 160A and employed to enable the various embodiments. Knowledge graph database 160B may include knowledge graphs that are employed to determine ranked lists of categories associated with an n-gram. Training data of training data database 160A may be employed to generate the knowledge graphs included in knowledge graph database 160B.

Figure 2A:
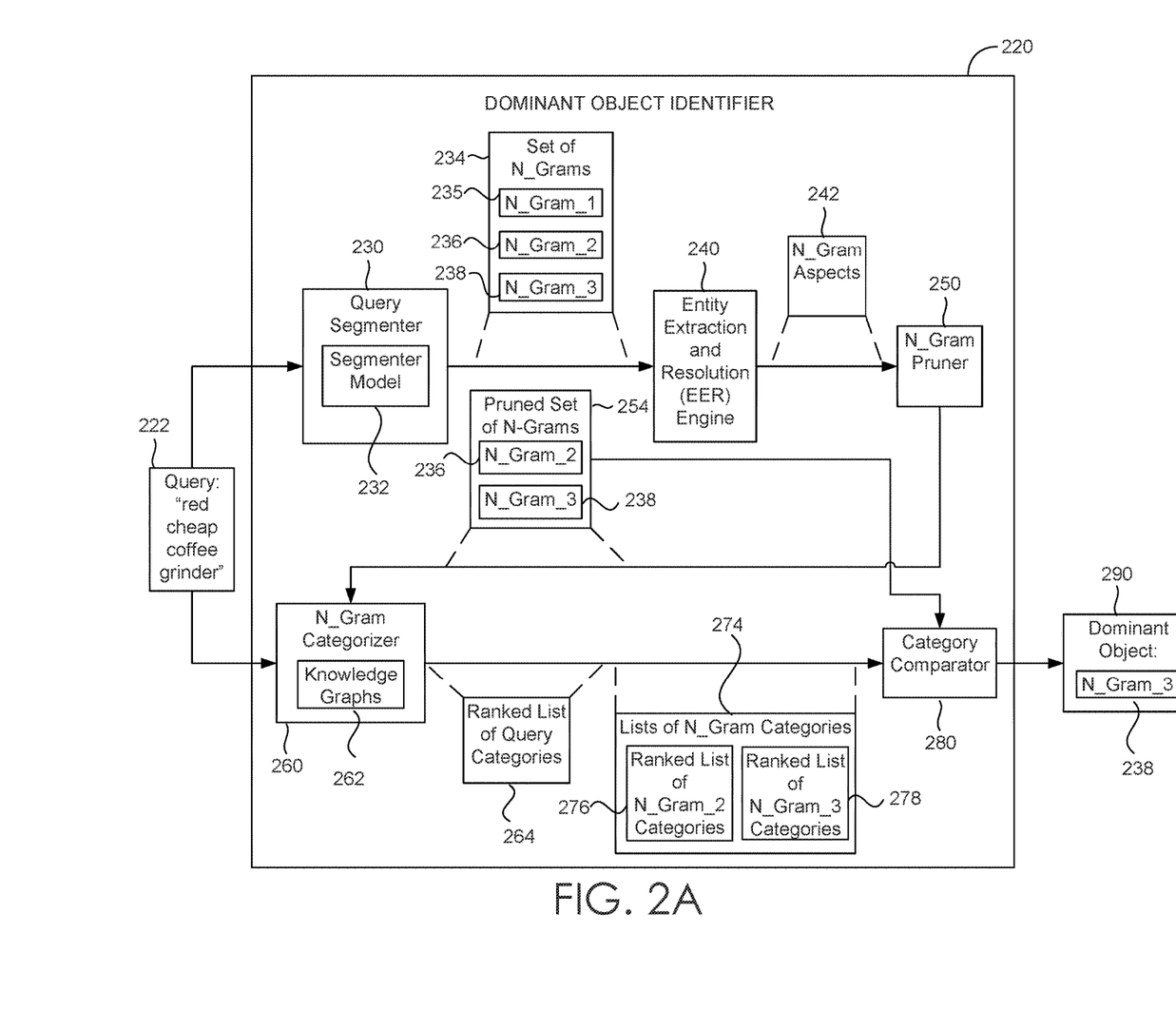
FIG. 2A is a block diagram of an exemplary dominant object identifier, in which embodiments described herein may be employed.
Figure 2B:
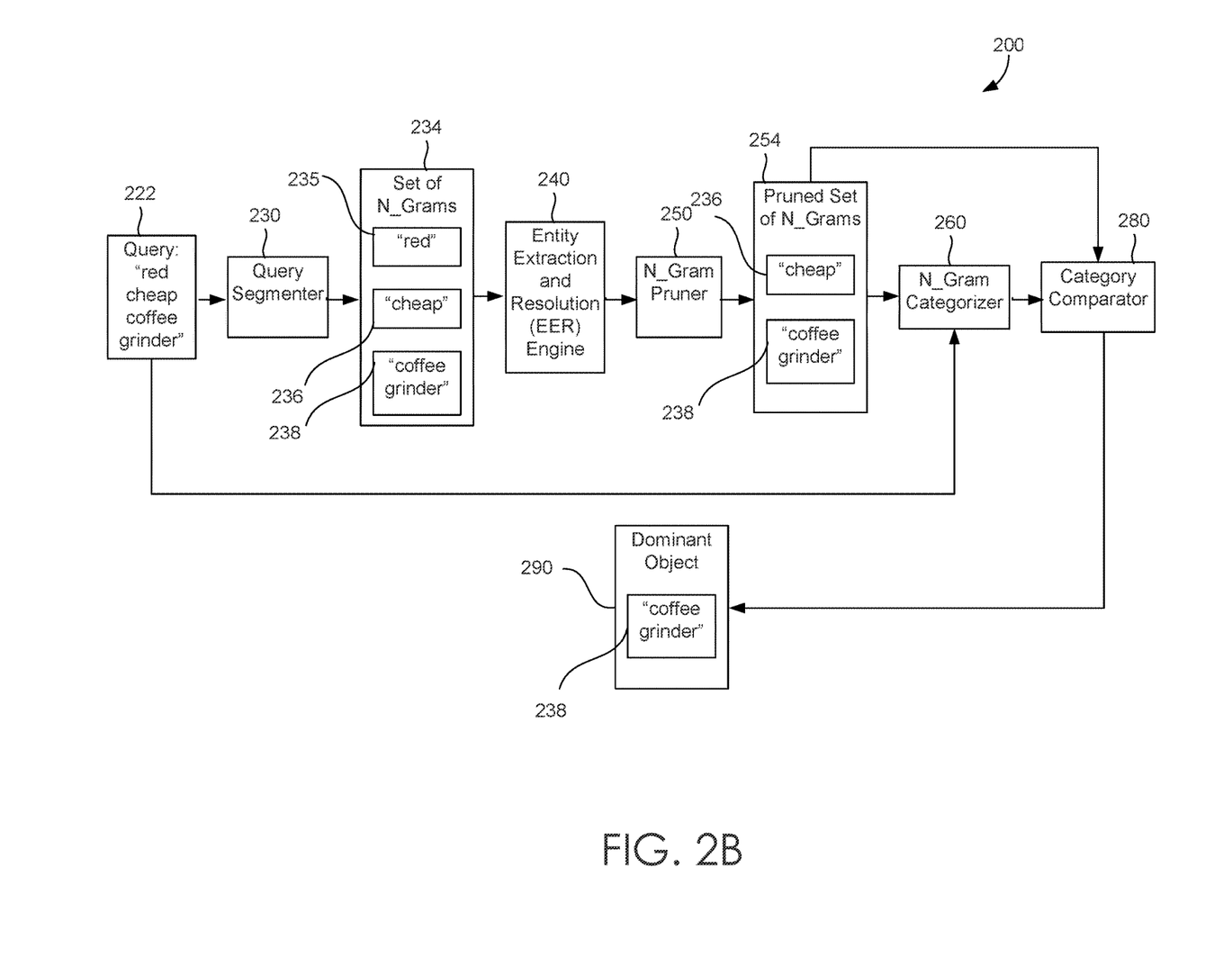
FIG. 2B is a workflow for the dominant object identifier of FIG. 2A, in which embodiments described herein may be employed.

Embodiments of the present invention can further be described with reference to FIGS. 2A and 2B, where FIGS. 2A and 2B further illustrate components in, and outputs from, the search engine 110 and specifically the dominant object identifier 120. FIG. 2A is a block diagram of an exemplary dominant object identifier 220, in which embodiments described herein may be employed. Dominant object identifier 220 may be similar to dominant object identifier 120 of FIG. 1. FIG. 2B is an exemplary workflow 200 for dominant object identifier 220 of FIG. 2A, in which embodiments described herein may be employed. FIGS. 2A and 2B will be discussed in conjunction with one another. Dominant object identifier 220 receives a query 222 (such as "red cheap coffee grinder") and determines and provides the dominant object 290 (e.g., "coffee grinder") of the query 222.

As shown in FIG. 2A, dominant object identifier 220 may include a query segmenter 230, and entity extraction and resolution (EER) engine 240, an n-gram pruner 250, an n-gram categorizer 260, and a category comparator 280. Query segmenter 230 receives query 222. Query segmenter 230 segments query 230 into a plurality of meaningful n-grams, e.g., set of n-grams 234. As shown in FIG. 2A, set of n_grams 234 includes three n_grams: n_gram_1 235, n_gram_2 236, and n_gram_3 238. However, other embodiments are not so constrained, and the set of n_grams 234 may include fewer or more than three n_grams. In the exemplary workflow 200 of FIG. 2B, n_gram_1 235 is the 1_gram "red", n_gram_2 236 is the 1_gram "cheap," and n_gram_3 238 is the 2_gram "coffee grinder," based on the non-limiting exemplary 4_gram query 222 "red cheap coffee grinder."

Various embodiments of segmenting query 222 into a meaningful set of n_grams 234 are discussed in conjunction with the '663 application. However, briefly here query segmenter 230 includes a segmenter model 232 that is trained to segment query 222. Segmenter model 232 may be a classifier model that is trained via supervised machine learning and labeled training data. A word or token embedder may embed each token in query 222 within a low-dimensional feature space, where the boundaries between n-grams of set of n_grams 234 are determined based on the vectors representing consecutive tokens in the query. Segmenter model 232 may be trained, via supervised learning and labeled training data, to segment queries based on attributes or aspects that are meaningful in the context of e-commerce and online marketplaces.

Various word embedders, such as but not limited to word2vec, Glove, or fastText may be employed to embed the tokens within the vector space. Segmenter model 232 may be employed to segment query 222 via determination of boundaries between consecutive n-grams based on the vector representation of the embedded tokens. In the non-limiting exemplary query "red cheap coffee grinder,", a first vector represents the first token "red," a second vector represents the second token "cheap," a third vector represents the third token "coffee," and a fourth token represents the fourth token "grinder." Based on at least a distance metric between the first and second vectors, the trained segmenter model generates an n-gram boundary between the first and second tokens. Based on the distance between the second and third vectors, the trained segmenter model generates another n-gram boundary between the second and third tokens. Based on the distance between the third and fourth vectors, the trained segmenter model does not generate an n-gram boundary between the third and fourth tokens. The trained segmenter may be trained to generate boundaries between tokens when the distance metric between the consecutive tokes is above a set distance threshold. A boundary is not generated between two token if the distance metric between the corresponding vectors is below the threshold. Thus, exemplary query 222 is segmented into a set of three meaningful n-grams: {"red" 235, "cheap" 236, "coffee grinder" 238}.

FIGS. 2A and 2B illustrate the set of n_grams 234 being provided to EER engine 240. EER engine 240 extracts and resolves explicit and implicit aspects (or attributes) (n_gram aspects 242) from each n_gram included in set of n_grams 234. One or more aspects of each of the n-grams of set of n_grams 234 may be identified by EER engine 240. The aspects may be identified as explicit, implicit, abstract, or the like. For example, some n-grams may identified as including explicit aspects such as color (e.g., red). While other n-grams may be identified as including abstract aspects such as "cheap." Other n-grams are identified as including implicit aspects such as "coffee grinder." For example, an n-gram with an explicit aspect (e.g., "red,") may complement or modify an n-gram that includes implicit aspects (e.g., "coffee grinder"). Additionally, other n-grams may be identified as including abstract aspects such as "cheap." Other n-grams are identified as including implicit aspects such as "coffee grinder", "summer dress," and "rock climbing shoes."

Various machine learning techniques may be employed to train models employed by EER engine 240 to identify explicit and implicit aspects of various n_grams. The training data employed to train EER 240 may be targeted to one or more specific contexts, such as but not limited to product listing platforms. For instance, EER engine 240 may be trained to extract and resolve implicit and explicit aspects via classifier models trained via supervised learning. For example, n-grams that include explicit aspects, such as a color, are pruned from the set of n-grams. Thus, the set of n-grams {"red", "cheap", "coffee grinder"} may be pruned to the pruned set of n-grams {"cheap", "coffee grinder}. EER engine 240 may classify the attributes of n_grams as implicit, explicit, abstract, or the like, based on browsing data generated by users of an e-commerce platform.

N_gram aspects 242 for each n_gram included in the set of n_grams 234 is provided to n_gram pruner 250. N_gram pruner 250 prunes n_grams from the set of n_grams 234 that include explicit aspects, as determined via EER engine 240. Thus, at least one n_gram may be pruned from the set of n_grams 234 to generate a pruned set of n_grams 254. An n_gram included in the pruned set of n_grams 254 may be referred to as a candidate n_gram, as the n_grams included in the pruned set of n_grams are candidates for the dominant object of query 222.

As shown in FIG. 2A, n_gram_1 235 has been pruned from pruned set of n_grams 254, such that the pruned set of n_grams 254 includes two n_grams: n_gram_2 236 and n_gram_3 238. Thus, n_gram_2 236 and n_gram_3 238 are candidates for the dominant object of query 222, but n_gram_1 235 is not a candidate for the dominant object of query 222. No n_gram or one or more n_grams may be pruned from the set of n_grams 234 to generate the pruned set of n_grams 254 (i.e., candidate n_grams). As shown in FIG. 2B, pruned set of n_grams 254 includes 1_gram "cheap" 236 and 2_gram "coffee grinder" 238 because 1_gram "red" 235 include explicit aspects (i.e., a color), whereas "cheap" 236 includes abstract aspects and "coffee grinder" 238 includes implicit aspects, as determined via EER engine 240.

Pruned set of n_grams 254 is provided to n_gram categorizer 260. For each n_gram included in pruned set of n_grams 254 (i.e., for each candidate n_gram), n_gram categorizer 260 determines a ranked list of categories associated with the n_gram. Knowledge graphs of ranked categories of candidate n-grams are compared to knowledge graphs of ranked categories of the query (i.e., un-segmented query) to identify a candidate n-gram with the highest ranking category. In particular, n_gram categorizer employs one or more previously generated knowledge graphs 262 to determine or generate the ranked list of categories associated with a particular candidate n-gram of the pruned set of n-grams 254. Thus, n_gram categorizer 260 generates ranked lists of n_gram categories 274. More specifically, based on knowledge graphs 262, n_gram categorizer 260 generates a ranked list of n_gram_2 categories 276 (i.e., a ranked list of categories that are associated with n_gram_2 236) and a ranked list of n_gram_3 categories 278 (i.e., a ranked list of categories that are associated with n_gram_3 238).

FIGS. 2A and 2B illustrate the un-segmented query 222 also being provided to n_gram categorizer 260. The n_gram categorizer 260 generated a ranked list of query categories 264, i.e., a ranked list of categories that are associated with the un-segmented query 222. Note that n_gram categorizer 260 may treat the un-segmented query 222 as an n_gram (with a larger n than any of the candidate n_grams of pruned set of n_grams 254). That is, n_gram categorizer 260 may employ knowledge graphs 264 to generated ranked list of query categories 264.

The ranked lists of n_gram categories 274 and the ranked list of query categories 264 are provided to category comparator 280. As shown in FIGS. 2A and 2B, the pruned set of n_grams 254 are also provided to category comparator 280. Category comparator 280 is enabled to select one of the candidate n_grams (i.e., n_gram_2 236 or n_gram_3 238) as the dominant object of query 222 based on a comparison of the ranked lists of n_gram categories 274 with the ranked listed of query categories 264. That is, category comparator 280 compares ranked list of n_gram_2 categories 276 with ranked list of query categories 264. Category comparator 280 also compared ranked list of n_gram_3 categories 278 with ranked list of query categories 264. Based on the multiple comparisons with the ranked list of query categories 264, the category comparator 280 selects the candidate n_gram with the highest ranked category that is common to the corresponding ranked n_gram categories and ranked query categories.

For instance, ranked list of n_gram_3 categories 278 includes the category "coffee" as a highly ranked category associated with n_gram_3 238 (i.e., "coffee grinder"). In contrast, the "coffee" category is not highly associated with n_gram_2 236 (i.e., "cheap"), and thus "coffee" is not highly ranked in ranked list of n_gram_2 categories 276. However, the "coffee" category is highly ranked in the ranked list of query categories 264. Thus, based on such comparisons of ranked lists of associated categories, category comparator 280 selects n_gram_3 238 from the pruned set of n_grams as the dominant object of query 222. FIGS. 2A and 2B shows dominant object identifier 220 providing the determined dominant object 290 of query 222, i.e., n_gram_3 238 (or the 2 gram "coffee grinder.").

Figure 3:
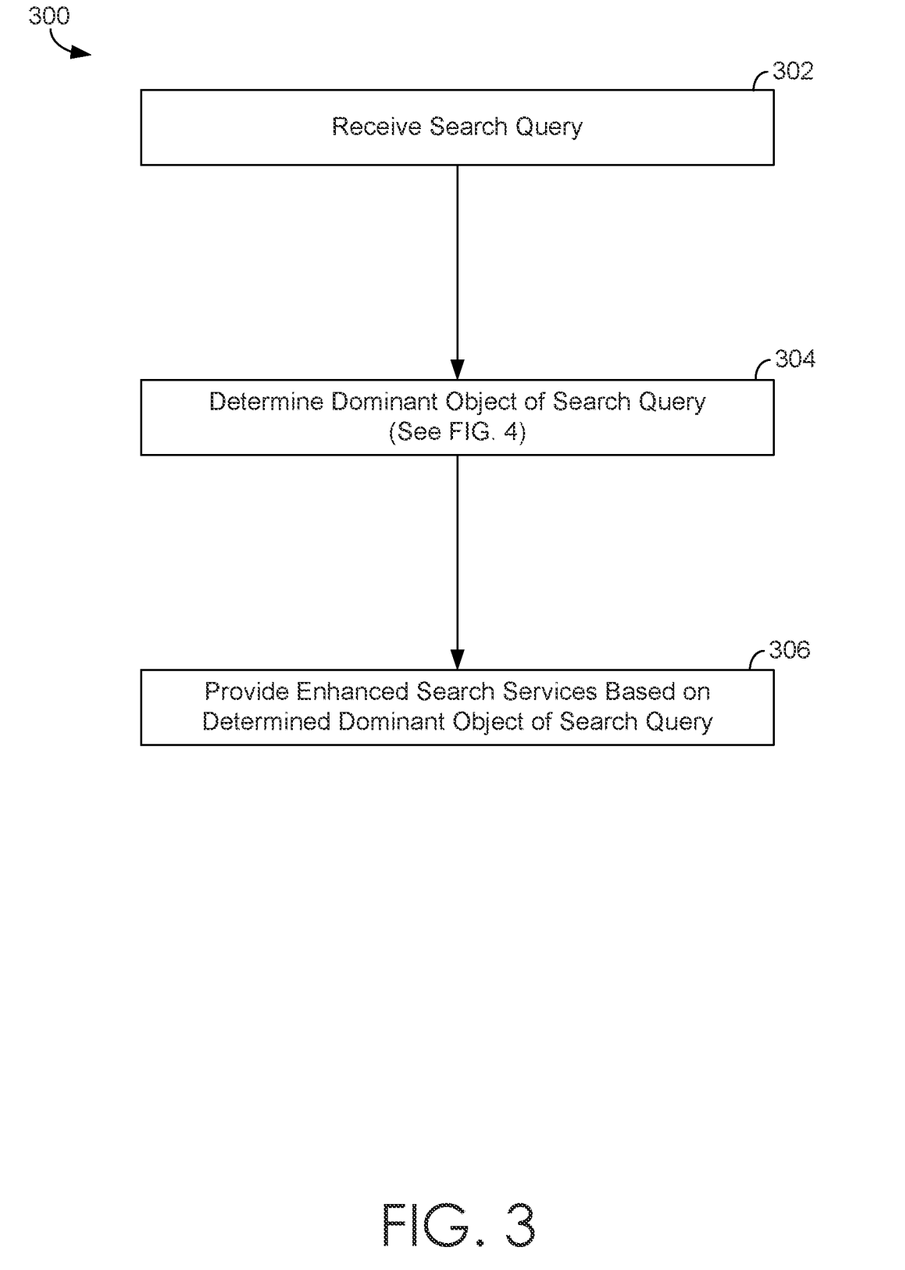
FIG. 3 is a flow diagram showing an exemplary method for providing enhanced search services based on the determination of a query's dominant object, in accordance with embodiments described herein.

Turning to FIG. 3, a flow diagram is provided that illustrates a method 300 for providing enhanced search services based on the determination of a query's dominant object. Initially, at block 302, a query is received at an enhanced search engine, such as enhanced search engine 110 of FIG. 1. A computing device, such as but not limited to computing device 180 of FIG. 1, may provide the search query. At block 304, the dominant object of the received search query is determined and identified. Various embodiments, for determining a dominant object of a search query, are described in conjunction with at least process 400 of FIG. 4. However, briefly here, a dominant object identifier, such as but not limited to dominant object identifier 120 of FIG. 1 or dominant object identifier 220 of FIG. 2A may be employed to determine the dominant object of the search query at block 304. For instance, workflow 200 of FIG. 2B may enable the determination of the dominant object. At block 306, enhanced search services may be provided based on the dominant object of the search query, as determined via block 304. As a non-limiting example, an enhanced search services provider, such as but not limited to enhanced search services provided 150 of FIG. 1 may provide any of the enhanced search services discussed herein to a user of computing device 180.

Figure 4:
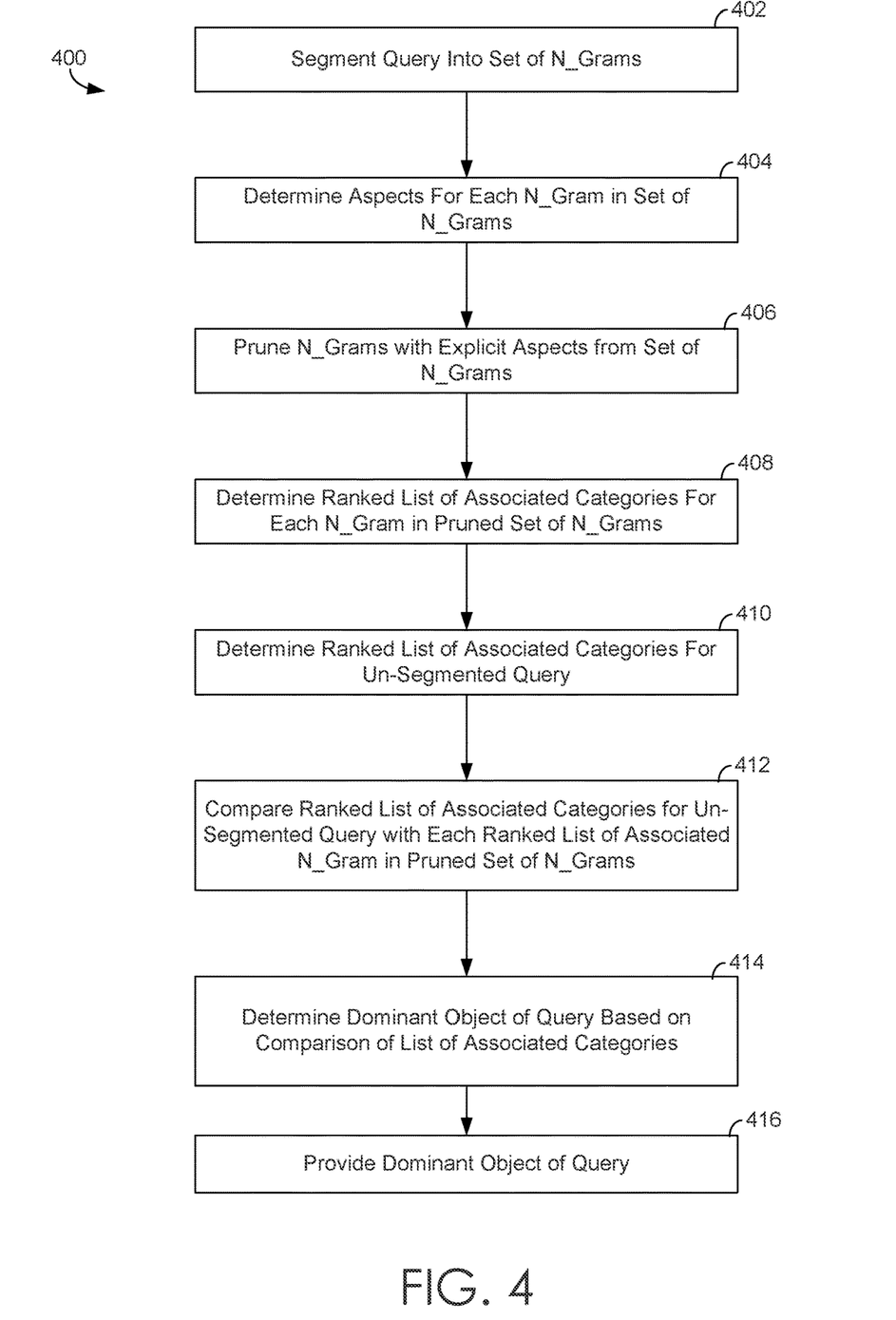
FIG. 4 is a flow diagram showing an exemplary method for determining a query's dominant object, in accordance with embodiments described herein.

Turning to FIG. 4, a flow diagram is provided that illustrates an exemplary method 400 for determining a query's dominant object. Initially at block 402, a query is segmented into a set of meaning n_grams. Various embodiments, for segmenting a query into meaningful n_grams, are discussed in conjunction the '663 application. However, briefly here, a query segmenter, such as but not limited to query segmenter 230 of FIGS. 2A and 2B, may segment the query into a set n_grams, based on a trained segmenter and classifier model. At block 404, aspects or attributes for each n_gram included the set of n_grams are determined. As an example EER engine 240 of FIGS. 2A and 2B may be employed to extract and resolve implicit, explicit, and abstract aspects of each n_gram. At block 406, n_grams with explicit aspects are pruned from the set of n_grams. An n_gram pruner, such as n_gram pruner 250 may prune n_grams with explicit aspects to generate a pruned set of n_grams that includes candidate n_grams. Each candidate n_gram included in the pruned set of n_grams may be a candidate for the dominant object of the query.

At block 408, for each candidate n_gram included in the pruned set of n_grams, a ranked list of categories associated with the n_gram is generated. For example, n_gram categorizer of FIGS. 2A and 2B may employ knowledge graphs to generate a ranked list of associated categories for each candidate n_gram. At block 410, a ranked list of categories associated with the un-segmented query is generated. Similarly to block 408, an n_gram categorizer may employ knowledge graphs to generate a ranked listed of query categories. At block 412, the ranked list of associated categories for the un-segmented query is compared with each ranked list of associated n_grams in the pruned set of n_grams. A category comparator, such as but not limited to category comparator 280 of FIGS. 2A and 2B may be enabled to perform such comparisons of ranked lists. At block 414, the dominant object of the query is determined based on the comparison of ranked lists performed via block 412. For instance, the category comparator may select the candidate n_gram from the pruned set of n_grams associated with the highest ranking category that is in common with a high ranking category of the ranked lists of categories associated with the query. The selected candidate n_gram may be determined and identified as the dominant object of the query. At block 416, the dominant object is provided. For instance, a dominant object identifier may provide the dominant object to an enhanced search services provider such as enhanced search services provider 150 of FIG. 1.

With reference to the search system 100, embodiments described herein support determining a dominant object of a search query, and providing enhanced search services based on the determined dominant object. The search system components refer to integrated components that implement the enhanced search system. The integrated components refer to the hardware architecture and software framework that support functionality using the search system components. The hardware architecture refers to physical components and interrelationships thereof and the software framework refers to software providing functionality that can be implemented with hardware operated on a device. The end-to-end software-based search system can operate within the other components to operate computer hardware to provide search system functionality. As such, the search system components can manage resources and provide services for the search system functionality. Any other variations and combinations thereof are contemplated with embodiments of the present invention.

By way of example, the search system can include an API library that includes specifications for routines, data structures, object classes, and variables may support the interaction the hardware architecture of the device and the software framework of the search system. These APIs include configuration specifications for the search system such that the components therein can communicate with each other for form generation, as described herein.

With reference to FIG. 1, FIG. 1 illustrates an exemplary search system 100 in which implementations of the present disclosure may be employed. In particular, FIG. 1 shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed can be performed in a distributed manner. The system may be formed from other systems and components thereof. It should be understood that this and other arrangements described herein are set forth only as examples.

Having identified various component of the search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The search system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and software. For instance, various functions may be carried out by a processor executing instructions stored in memory.

Figure 5:
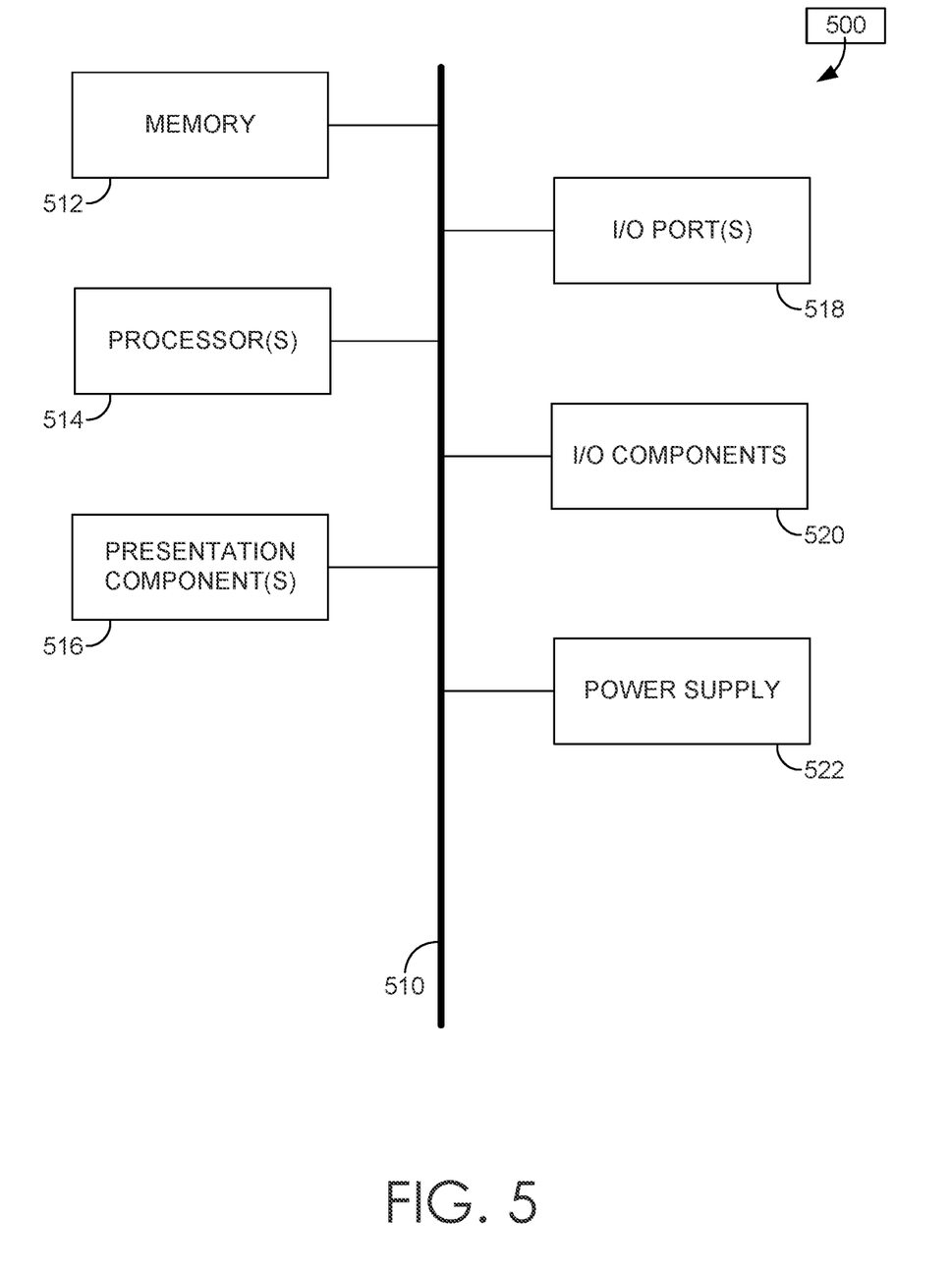
FIG. 5 is a block diagram of an exemplary computing environment suitable for use in implementing embodiments described herein.

Having described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed data object management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed by one or more processors, cause the one or more processors to perform operations comprising:
    receiving an unsegmented query;
    determining a ranked list of categories for the unsegmented query;
    segmenting the unsegmented query into a set of n-grams;
    determining a category for a first n-gram from the set of n-grams; and
    determining the first n-gram comprises a dominant object of the unsegmented query based on the ranked list of categories for the unsegmented query and the category for the first n-gram.

2. The one or more computer storage media of claim 1, wherein determining the first n-gram comprises the dominant object of the unsegmented query comprises:
    determining the category for the first n-gram corresponds to a highest ranking category from the ranked list of categories for the unsegmented query.

3. The one or more computer storage media of claim 1, wherein the operations further comprise:
    receiving the unsegmented query from a user interface of an e-commerce platform;
    identifying, based on the determined dominant object, a product or a service made available by the e-commerce platform; and
    causing display, at the user interface of the e-commerce platform, of an indication of the product or the service made available by the e-commerce platform.

4. The one or more computer storage media of claim 1, wherein the unsegmented query includes an ordered set of tokens and each n-gram in the set of n-grams includes an ordered subset of the ordered set of tokens.

5. The one or more computer storage media of claim 1, wherein the operations further comprise:
    for each n-gram in the set of n-grams, determining one or more aspects of the n-gram, wherein each determined aspect is identified as an explicit aspect or a non-explicit aspect based on an application of entity extraction;
    generating a pruned set of n-grams by pruning, from the set of n-grams, each n-gram that includes one or more explicit aspects, wherein the pruned set of n-grams includes the first n-gram.

6. The one or more computer storage media of claim 1, wherein segmenting the unsegmented query into the set of n-grams comprises:
    determining a boundary between the first n-gram and a second n-gram of the set of n-gram that is n grams based on a distance between a first vector and a second vector within a vector space, the first vector representing a first embedded token included in the first n-gram and the second vector representing a second embedded token included in the second n-gram.

7. The one or more computer storage media of claim 1, wherein the operations further comprise:
    employing one or more knowledge graphs to generate the ranked list of categories for the unsegmented query.

8. A computer-implemented method comprising:
    receiving an unsegmented query;
    determining a ranked list of categories for the unsegmented query;
    segmenting the unsegmented query into a set of n-grams;
    determining a category for a first n-gram from the set of n-grams; and
    determining the first n-gram comprises a dominant object of the unsegmented query based on the ranked list of categories for the unsegmented query and the category for the first n-gram.

9. The computer-implemented method of claim 8, wherein determining the first n-gram comprises the dominant object of the unsegmented query comprises:
    determining the category for the first n-gram corresponds to a highest ranking category from the ranked list of categories for the unsegmented query.

10. The computer-implemented method of claim 8, further comprising:
    receiving the unsegmented query from a user interface of an e-commerce platform;
    identifying, based on the determined dominant object, a product or a service made available by the e-commerce platform; and
    causing display, at the user interface of the e-commerce platform, of an indication of the product or the service made available by the e-commerce platform.

11. The computer-implemented method of claim 8, wherein the unsegmented query includes an ordered set of tokens and each n-gram in the set of n-grams includes an ordered subset of the ordered set of tokens.

12. The computer-implemented method of claim 8, further comprising:
    for each n-gram in the set of n-grams, determining one or more aspects of the n-gram, wherein each determined aspect is identified as an explicit aspect or a non-explicit aspect based on an application of entity extraction;
    generating a pruned set of n-grams by pruning, from the set of n-grams, each n-gram that includes one or more explicit aspects, wherein the pruned set of n-grams includes the first n-gram.

13. The computer-implemented method of claim 8, further comprising:
    receiving, at a product listing platform, the unsegmented query from an interface of a computing device that is a client computing device of the product listing platform;
    transmitting the unsegmented query to cause execution of one or more enhanced search services based on the determined dominant object;
    receiving one or more instructions based on the execution of the one or more enhanced search services based on the determined dominant object; and
    based on the one or more instructions, provide an identifier of the dominant object for display via the interface of the client computing device.

14. The computer-implemented method of claim 13, wherein segmenting the unsegmented query into the set of n-grams comprises:
    determining a boundary between the first n-gram and a second n-gram of the set of n-grams based on a distance between a first vector and a second vector within a vector space, the first vector representing a first embedded token included in the first n-gram and the second vector representing a second embedded token included in the second n-gram.

15. A system comprising:
one or more processors; and
one or more computer storage media storing computer-useable instructions that, when used by the one or more processors, cause the one or more processors to perform actions comprising:
receiving an unsegmented query;
determining a ranked list of categories for the unsegmented query;
segmenting the unsegmented query into a set of n-grams;
determining a category for a first n-gram from the set of n-grams; and
determining the first n-gram comprises a dominant object of the unsegmented query based on the ranked list of categories for the unsegmented query and the category for the first n-gram.

16. The system of claim 15, wherein determining the first n-gram comprises the dominant object of the unsegmented query comprises:
determining the category for the first n-gram corresponds to a highest ranking category from the ranked list of categories for the unsegmented query.

17. The system of claim 15, wherein the actions further comprise:
receiving the unsegmented query from a user interface of an e-commerce platform;
identifying, based on the determined dominant object, a product or a service made available by the e-commerce platform; and
causing display, at the user interface of the e-commerce platform, of an indication of the product or the service made available by the e-commerce platform.

18. The system of claim 15, wherein the unsegmented query includes an ordered set of tokens and each n-gram in the set of n-grams includes an ordered subset of the ordered set of tokens.

19. The system of claim 15, wherein the actions further comprise:
for each n-gram in the set of n-grams, determining one or more aspects of the n-gram, wherein each determined aspect is identified as an explicit aspect or a non-explicit aspect based on an application of entity extraction;
generating a pruned set of n-grams by pruning, from the set of n-grams, each n-gram that includes one or more explicit aspects, wherein the pruned set of n-grams includes the first n-gram.

20. The system of claim 15, wherein segmenting the unsegmented query into the set of n-grams comprises:
determining a boundary between the first n-gram and a second n-gram of the set of n-gram that is n-grams based on a distance between a first vector and a second vector within a vector space, the first vector representing a first embedded token included in the first n-gram and the second vector representing a second embedded token included in the second n-gram.

* * * * *